United States Patent [19]

Muta et al.

[11] 4,371,569

[45] Feb. 1, 1983

[54] METHOD FOR REINFORCING AND REPAIRING PIPING

[75] Inventors: Natsuo Muta, Fukuoka; Toshihisa Kanamaru, Kitakyushu, both of Japan

[73] Assignees: Saibu Gas Co. Ltd.; Kabushiki Kaisha Kankyo Kaihatsu, both of Fukuoka, Japan

[21] Appl. No.: 306,753

[22] Filed: Sep. 29, 1981

Related U.S. Application Data

[62] Division of Ser. No. 125,772, Feb. 29, 1980, Pat. No. 4,308,824.

[30] Foreign Application Priority Data

Nov. 22, 1979 [JP] Japan ............................. 54-151727

[51] Int. Cl.³ ............................ B05L 7/08; B05D 1/26
[52] U.S. Cl. ....................................... 427/230; 427/299
[58] Field of Search ................. 427/8, 140, 9, 10, 230, 427/239, 299, 235; 118/670, 713, 306, 105, 408, 72, DIG. 10, DIG. 13

[56] References Cited

U.S. PATENT DOCUMENTS

| | | | |
|---|---|---|---|
| 2,095,888 | 10/1937 | Perkins | 118/306 X |
| 3,022,765 | 2/1962 | Xenis | 118/669 |
| 3,037,228 | 6/1962 | Cummings | 118/306 X |
| 3,039,428 | 6/1962 | McLean | 118/306 X |
| 4,178,875 | 12/1979 | Moschetti | 118/712 |
| 4,218,989 | 8/1980 | Fujita et al. | 118/713 |

FOREIGN PATENT DOCUMENTS

| | | |
|---|---|---|
| 2448932 | 4/1976 | Fed. Rep. of Germany ...... 118/408 |
| 47-29771 | 8/1972 | Japan . |
| 51-10200 | 3/1976 | Japan . |
| 51-18746 | 6/1976 | Japan . |
| 51-23806 | 7/1976 | Japan . |
| 5094456 | 2/1977 | Japan . |
| 52-13651 | 3/1977 | Japan . |
| 52-87854 | 7/1977 | Japan . |

*Primary Examiner*—John P. McIntosh
*Attorney, Agent, or Firm*—Sandler & Greenblum

[57] ABSTRACT

A method and apparatus for reinforcing and repairing piping are disclosed for forming a film on the inside of a pipe line. The apparatus includes a film forming device having spaced radially extending front and rear walls which is inserted within the pipe line. When so inserted, the apparatus and the inside surface of the pipe line define an annular space into which film forming material is introduced. This annular space can be used to straddle a cracked portion of the pipe line, a joint or other inadequately sealed areas in which leakage may occur. A film adjusting device comprising a rotary driving element and a rotary film adjusting element are provided and are flexibly connected to the film forming device. The rotary drive device includes a motor and spaced front and rear discs each of which is attached to a plurality of outwardly extending fragments. A hauling device is provided for moving both the film forming device and film adjusting device within the pipe line and an inspection device is provided to assist an operator in locating areas to which the film forming material must be carefully applied. The method comprises inserting the devices within a pipe line, moving them through the pipe line, applying film forming material to the inner surface of the pipe line and stopping the devices at potential leakage portions to properly reinforce these portions with film material.

3 Claims, 15 Drawing Figures

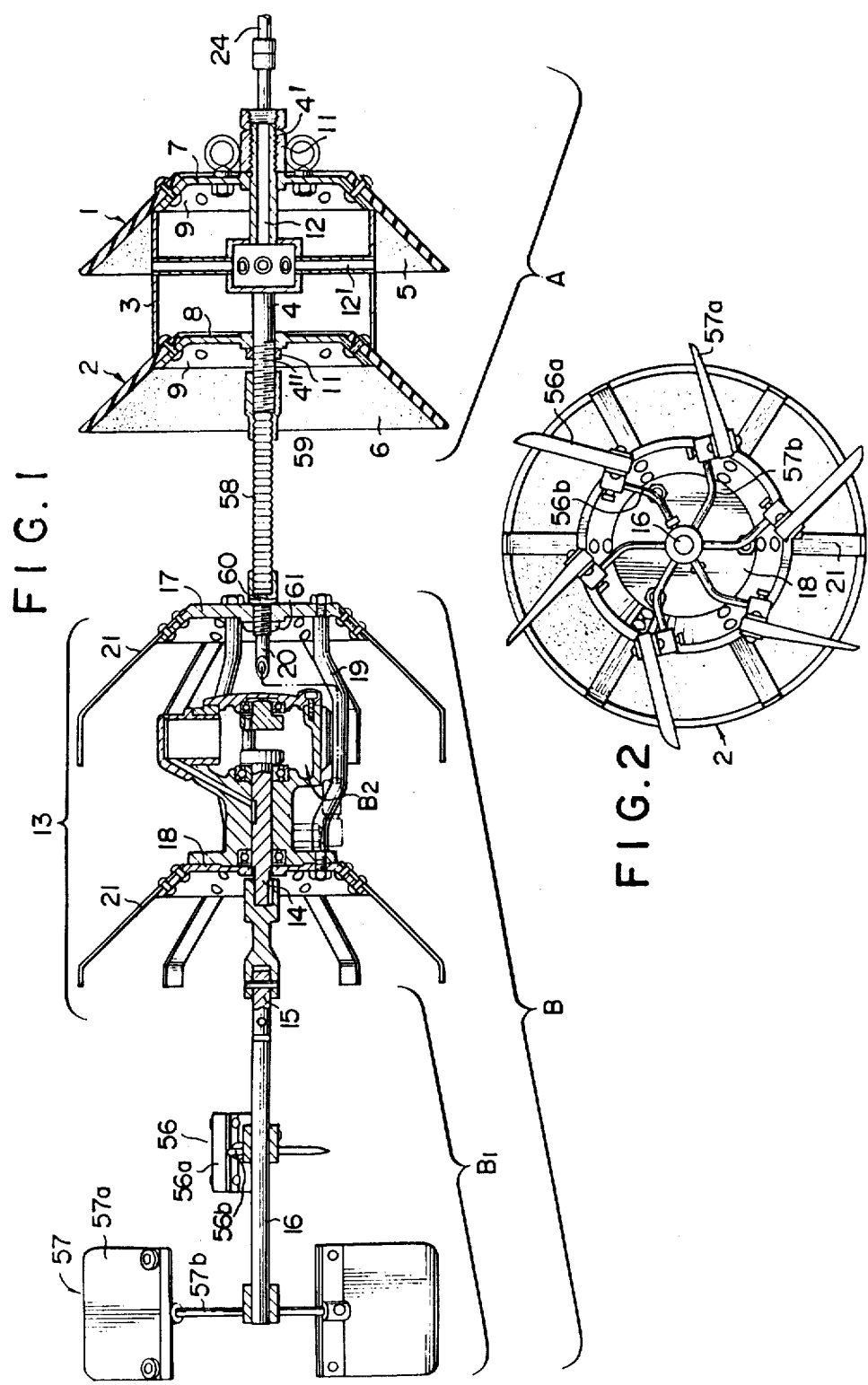

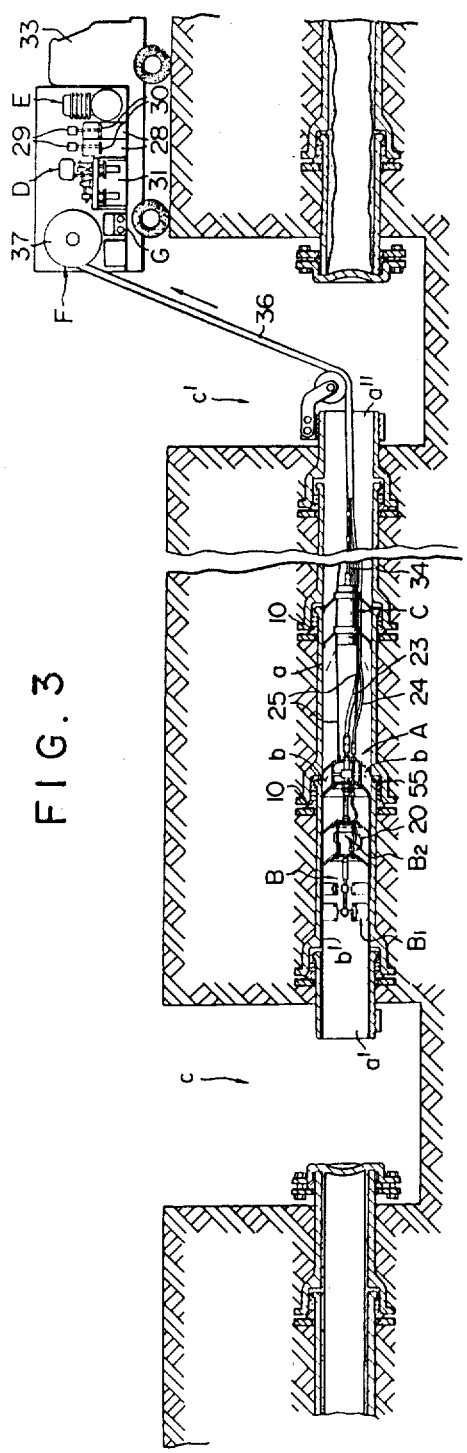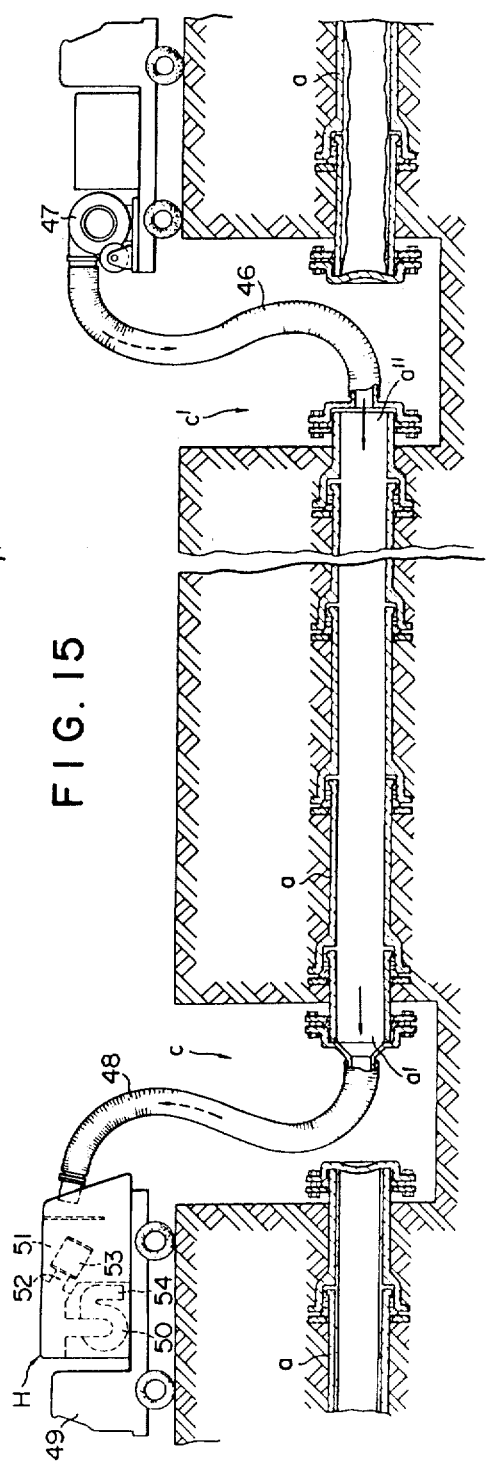

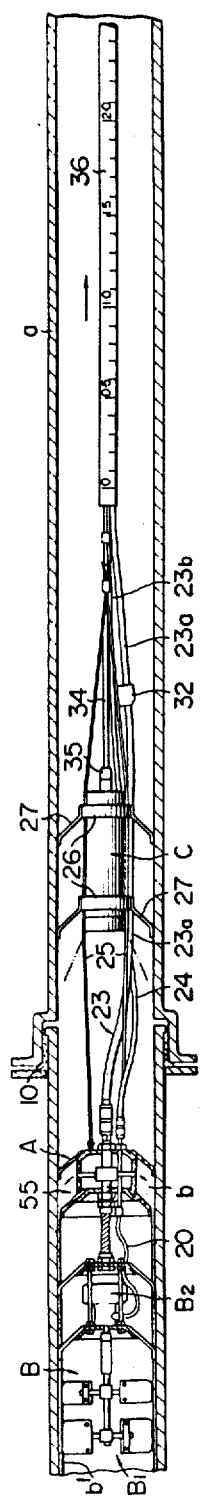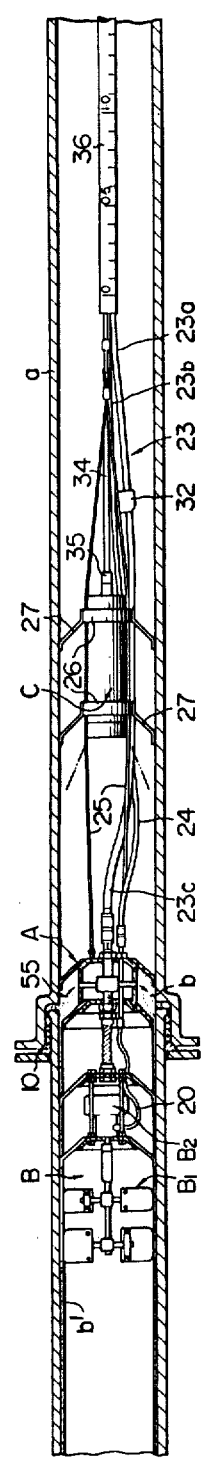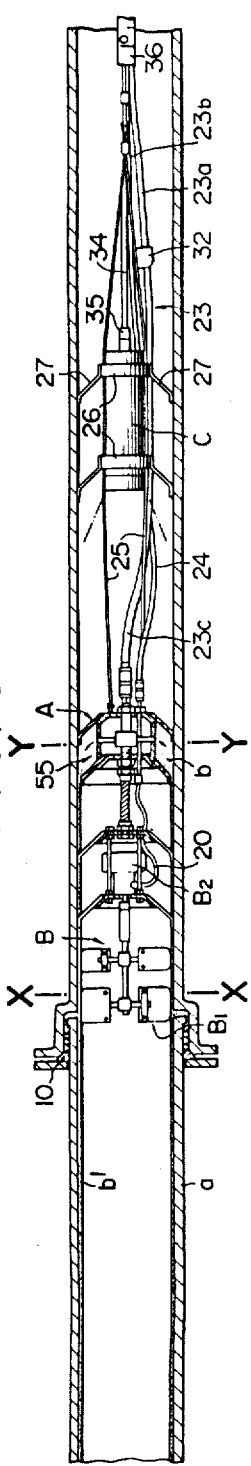

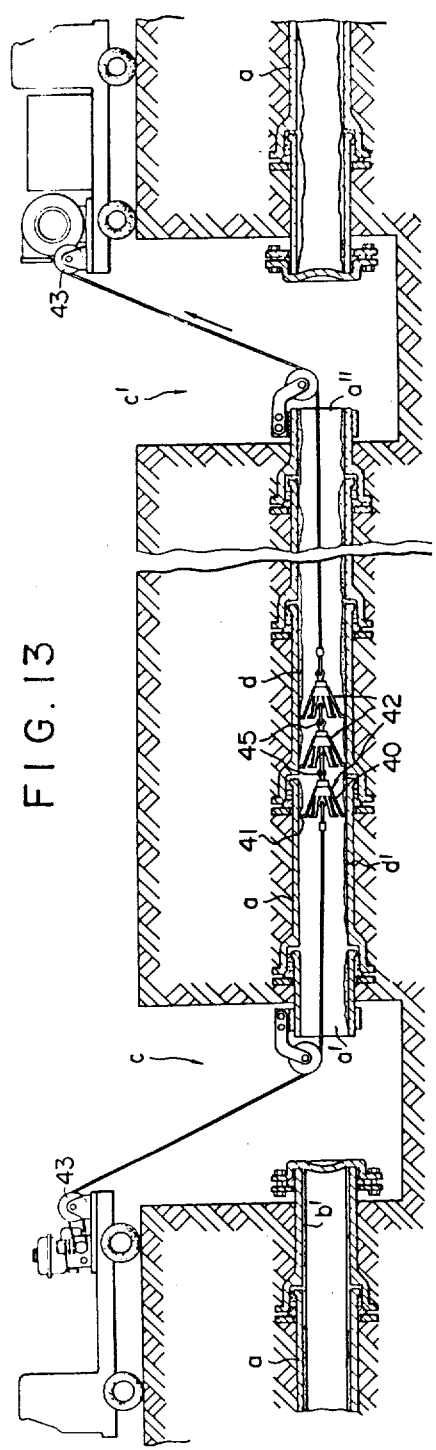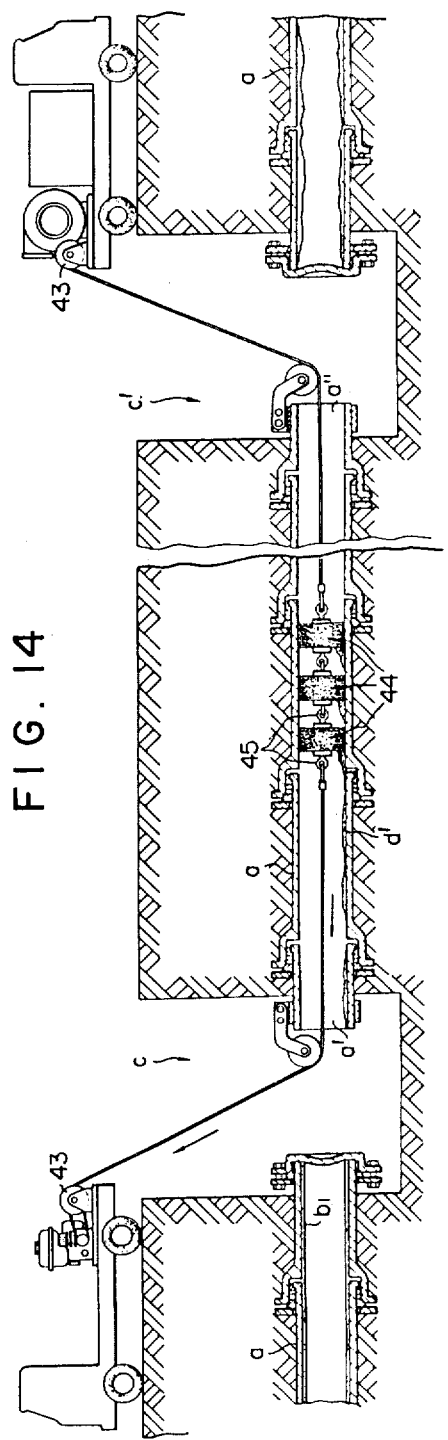

METHOD FOR REINFORCING AND REPAIRING PIPING

This is a division of application Ser. No. 125,772 filed Feb. 29, 1980, now U.S. Pat. No. 4,308,824.

BACKGROUND OF THE INVENTION

Field of Invention

The present invention relates generally to a method for reinforcing and repairing piping and more particularly to a method for reinforcing and repairing piping which includes forming a film on the inside of a pipe line and adjusting the amount of film formed on the pipe line.

More specifically, the present invention relates to an apparatus for reinforcing and repairing various existing or newly installed pipe lines which are installed on the ground, buried underground, or mounted on ships or other structures (e.g. pipe lines for fuels such as city gas, propane gas or natural gas, water supply pipe lines, drainage pipes, pipes for cooling water at an atomic power plant and petroleum pipe lines).

Where such pipe lines, (e.g. gas or water supply pipe lines), have a crack or an inadequate sealing at joints in the pipe line, the fluid (e.g. gas or water) contained therein will leak out of the pipe lines, or, in the case of drainage pipe lines, underground water adjacent to the pipe lines will enter the pipe lines. In order to prevent such leakage or undesirable entrance of material, it is necessary to repair the pipe lines periodically.

The present invention relates to an apparatus for use in accomplishing such repairs and is designed to apply a film coating on the inner surface of pipe lines to prevent leakage.

SUMMARY OF THE INVENTION

Accordingly, in view of the above stated problems, it is a general object of the present invention to provide a new and improved method and apparatus for reinforcing and repairing piping in which a film is applied to the inner surface of a pipe line.

Another object of the present invention is to provide a new and improved method for reinforcing and repairing piping which will both completely and securely seal possible leaking portions of pipe lines and will form a uniform thickness film coating over the entire inner surface of the pipe line, thereby providing an apparatus capable of both completely preventing leakage from the pipe lines and simultaneous reinforcing and repairing the pipe lines.

A further object of the present invention is to provide a new and improved method for reinforcing and repairing piping in which the interiors of pipe lines are coated with film supplied to the film forming apparatus and then the thickness or amount of the film which has been applied to the interior surface of the pipeline is adjusted.

An additional object of the present invention is to provide a new and improved method for reinforcing and repairing piping in which apparatus is provided for reviewing and inspecting the film application and adjustment process, particularly with respect to areas which are highly susceptible to leakage and which accordingly must be carefully sealed.

Upon further study of the specification and appended claims, further objects, features and advantages of the present invention will become more fully apparent to those skilled in the art to which this invention pertains.

Briefly, the above and other objects, features and advantages of the present invention are attained in one aspect thereof of providing an apparatus for reinforcing and repairing a pipe line. The apparatus includes means for forming a film on the inside of the pipe line and means for adjusting the amount of film formed on the inside surface thereof. Additionally, means for inspecting the film forming means and the inside of the pipe are provided and means for connecting the film forming means, the film adjusting means and the inspecting means are also provided. Means for hauling the film forming means, the film adjusting means and the inspecting means are used to move all of the former means within the pipe line, and means for supplying film forming material to the film forming means are also included.

The above and other objects, features and advantages of the present invention are attained in another aspect thereof by providing a method for reinforcing and repairing a pipe line which comprises inserting a film forming device and a film adjusting device in a pipe line and moving these devices through the pipe line. The method also includes the step of applying film forming material to the inner surface of the pipe line and inspecting the inner surface throughout the movement and application to locate possible leakage portions in the pipe line. The devices are stopped when the film forming device is positioned adjacent one of the portions, and material is then applied to that area to completely and securely seal such portions.

BRIEF DESCRIPTION OF THE DRAWINGS

The above and other objects, features and advantages of the present invention will be more fully apparent to those of ordinary skill in the art to which this invention pertains from the following descriptions when considered in connection with the accompanying drawings, in which like reference characters designate like or corresponding parts throughout the several views and wherein:

FIG. 1 is a longitudinal sectional view of the apparatus for reinforcing and repairing a pipe line formed in accordance with the present invention;

FIG. 2 is a left-hand side plan view of the apparatus of FIG. 1;

FIG. 3 is a longitudinal sectional view illustrating the manner in which the apparatus of FIG. 1 is used to reinforce and repair an existing underground pipe line;

FIGS. 4 through 6 are enlarged longitudinal sectional views illustrating the manner in which the major elements of the apparatus of FIG. 1, i.e. a film forming device, a film adjusting device and an inspection device, travel within the pipe line relative to a joint portion of the pipe line;

FIGS. 13 through 15 are all longitudinal sectional views illustrating steps in preparatory work done prior to the reinforcing and repairing of existing underground pipe lines using apparatus formed in accordance with the present invention; FIGS. 13 and 14 illustrate the steps of scraping off scales from a pipe wall and FIG. 15 illustrates the step of evacuating the fallen scales from a pipe line.

DESCRIPTION OF PREFERRED EMBODIMENTS

Figure 7:
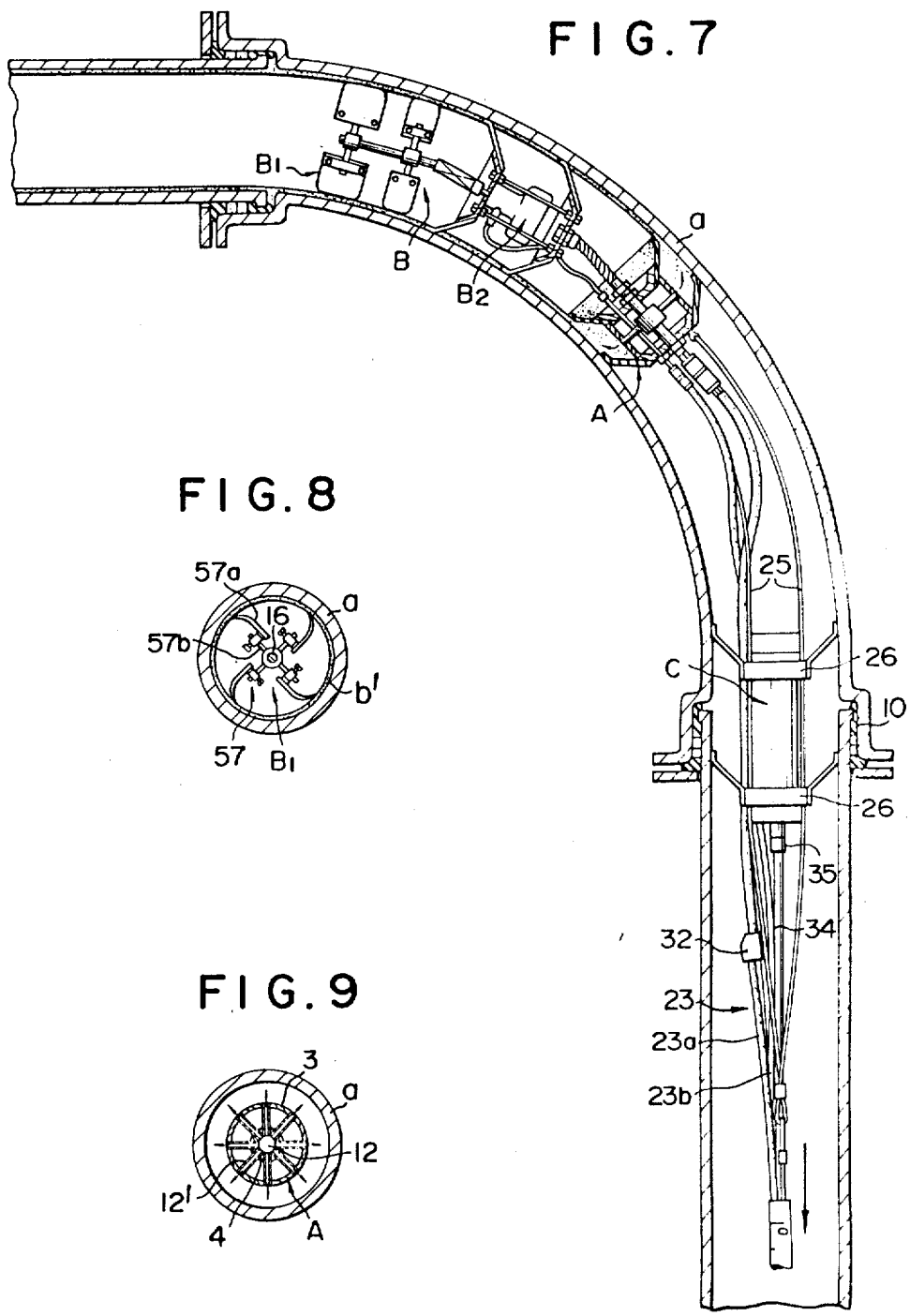
FIG. 7 is a longitudinal sectional view illustrating the manner in which the apparatus of FIG. 1 passes through a bent portion of the pipe line.

The present invention will now be described in greater detail with reference to the embodiment illustrated in the drawings.

More specifically, FIG. 1 illustrates a film forming apparatus (A) having a front wall 1 and a rear wall 2. The front and rear walls are separated from each other at a suitable distance by a spacer ring 3 and are securely connected by connector 4.

Walls 1 and 2 comprise, respectively, first and second or front and rear sleeves 5 and 6 made of an elastic material, e.g. abrasion resistant rubber or polyethelene. Each sleeve has the shape of a truncated cone with its top closed by first and second (i.e., front and rear) discs 7 and 8 which are made of a solid material, e.g. a metal. Discs 7 and 8 have at their peripheries flanges 9 for attachment to the sleeves. Flanges 9 are secured by suitable fastening means, e.g. rivets, to sleeves 5 and 6 along the inner surfaces of the top portions of the sleeves. Sleeves 5 and 6 flare outwardly towards their bottoms and the respective bottom openings of the sleeves have maximum diameters which are a little larger than the inner diameter of a pipe line (a) to be lined.

Rear wall sleeve 6 should preferably have snap preventive portions (not shown) along the periphery of its bottom opening in order to prevent the possibility of the sleeve snapping when the rear wall passes joint portion 10 of a pipe line (a) to be lined. The sleeve would otherwise snap due to the disappearance of outer pressure exerted by the pipe line inner surface, and, as a result, would push out or scrape out film forming material (b) from joint portion 10. The snap preventive portions may be formed in alternative ways, e.g., as an extension of the periphery of the bottom opening of rear wall 2 which extends either substantially parallel to the center axis of the rear wall or in a slightly flared fashion for a distance slightly greater than the length of joint portion 10 of the pipe line to be lined. Each portion will preferably have a plurality of generally V-shaped grooves extending at suitable intervals on its outer surface from its rear edge to the base of the bottom opening of rear wall 2.

Thus, front and rear walls 1 and 2 are arranged in the same direction on a common axis with their conical heads directed forwardly and with spacer ring 3 disposed between them. The walls are securely connected by connector 4. Connector 4 has at its two ends threaded portions 4' and 4" for attachment to nuts. The threaded portions extend through the centers of discs 7 and 8, respectively, and nuts 11 are attached to these portions outwardly of the discs so as to press front and rear walls 1 and 2 against spacer ring 3 located therebetween.

Connector 4 also serves as a discharge pipe line for film forming material supplied to film forming apparatus (A). More particularly, connector 4 comprises a discharge pipe line 12 for the film forming material which extends in the axial direction from an open end to a closed end at the middle part of the connector. The open end extends through front wall 1 and is detachably connected to a supply line 23 of film forming material supply device (D), which is more particularly described hereinafter. At the closed end radially extending outlets 12' are open along the periphery of spacer ring 3.

Spacer ring 3 is in the form of a cylinder having a diameter substantially the same as that of discs 7 and 8.

A film adjusting device (B) comprises a rotary film adjusting means (B1) and a rotary driving means (B2) for the rotary operation of the adjusting means. Rotary driving means (B2) comprises an air motor and is supported by a motor support 13. A rotary shaft 14 of the air motor is connected to a shaft 16 of rotary adjusting means (B1) via universal joint 15. Furthermore, an air inlet of the air motor is connected to an air conduit 20 which extends through discs 7 and 8 of film forming device (A) to the front of the film forming device and which is detachably connected to an air hose 24 of a compressed air supply device (E), described in greater detail hereinafter. At the air outlet side, a valve is provided to control the rotation of the motor. Support 13 comprises third and fourth discs 17 and 18, respectively, which are similar to discs 7 and 8 of film forming device (A) and which are spaced and connected at a suitable distance from each other by a plurality of connecting rods 19 and fragments 21 radially extending from the peripheries of discs 17 and 18. In this manner, a line (not shown) drawn to connect the front ends of the fragments forms a circle having a diameter slightly larger than the inner diameter of pipe line (a) to be lined, and when inserted in the pipe line, discs 17 and 18 can be held with their centers coinciding with the axis of pipe line (a). Between discs 17 and 18 air motor (B2) is positioned and mounted on rear disc 18 with its rotary shaft 14 extending through the center of disc 18.

Figure 8:
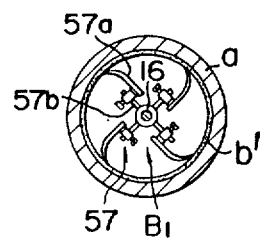
FIG. 8 is a cross sectional view of the apparatus of FIG. 1 within a pipe line taken along line X—X of FIG. 6.

Rotary adjusting means (B1) comprises a shaft 16 connected to rotary shaft 14 of air motor (B2) via universal joint 15, and first and second adjusting pieces 56 and 57, respectively, consisting of resilient flat plates or brushes 56a and 57a radially attached to shaft 16 via stems 56b and 57b. Adjusting pieces 56 and 57 have a length from shaft 16 to their respective front edges which is slightly greater than the radius of pipe line (a) to be lined. Rotary adjusting means (B1) is rotatably driven by air motor (B2) whereby elastic plates 56a and 57a of adjusting pieces 56 and 57 stroke the inner surface of pipe line (a) circumferentially, as illustrated in FIG. 8.

Elastic plate 56a of first adjusting piece 56 located near universal joint 15 (i.e. in a forward position on shaft 16) has a uniform thickness from its base to near its front edge and only its front edge is tapered in arcuate form, whereas plate 57a of second adjusting piece 57, located at a rear position on shaft 16, is tapered along one side from its base to its front edge so that its thickness gradually decreases towards the front edge. The tapered plates are best illustrated in FIG. 2.

Elastic plates 56a and 57a of adjusting pieces 56 and 57 have substantially the same thickness at their bases.

Thus, elastic plate 57a of second adjusting piece 57 is more elastic than elastic plate 56a of first adjusting piece 56. More particularly, first adjusting piece 56 is relatively stiff while second adjusting piece 57 is relatively flexible.

Film adjusting device (B) is connected to the rear portion of film forming device (A) via a flexible connecting rod 58.

Flexible connecting rod 58 comprises a rod prepared by twisting a plurality of metal wires alternately counterclockwise and clockwise, a nut 59 being secured at one end and a bolt 69 being secured at the other end. Nut 59 is adapted to mesh with threaded portion 4" of connector 4 extending through the center of rear wall 2, while bolt 60 extends to the center of front disc 17 of motor supports 30 with a nut 61 placed behind the front disc.

Film adjusting device (B) and film forming device (A) are connected in the above described manner and are pulled to move within a pipe line to be lined by a hauling device (F).

Specifically, hauling ropes 25 (e.g. wire ropes) are attached at one end to disc 7 of front wall 1 and the ropes are connected at their other end to hauling device (F), as seen in FIGS. 3 through 7.

An inspection device (C), which is a television camera in the embodiment illustrated in the drawings, is supported by hauling ropes 25 and the film forming material supply line 23 and is disposed at a suitable distance in front of film forming device (A).

Specifically, television camera (C) is secured at its periphery to hauling ropes 25 and film forming material supply line 23 by fastening bands 26 so that the camera angle, i.e. the viewing angle, is directed towards film forming device (A). Further, fastening bands 26 are provided with support legs 27 whereby television camera (C) is held within pipe line (a) along the same axis as film forming device (A).

A film forming material supply device (D) supplies film forming material to film forming device (A), and is hereinafter described in greater detail.

The film forming material (b) can be a two-liquid synthetic resin paint which comprises a principal paint liquid and a solidifier liquid and which solidifies as the two liquids are mixed (e.g., tar and epoxy are used whereby the principal liquid and the solidifier liquid are stored in separate liquid tanks 28 respectively).

The liquid tanks are provided with a stirrer or similar device 30 and each has stirrer vanes rotatably driven by a motor 29 and adapted to agitate paints continuously.

The principal and solidifier liquids in tanks 28 are pumped out by respective airless pumps 31 to principal liquid liquid supply line 23a and solidifier liquid supply line 23b, respectively.

Supply lines 23a and 23b for the principal and solidifier liquids are preferably flexible hoses, each of which has one end connected to one liquid tank 28 via one airless pump 31 and the other end of each being connected to one end of mixing pipe 23c via three-pronged connecting means 32. Mixing pipe 23c is connected to film forming material discharge pipe line 4 of film forming device (A) at its other end, as best illustrated in FIGS. 4 through 6.

Accordingly, film forming material supply line 23 comprises principal and solidifier supply lines 23a and 23b and mixing pipe 23c.

Mixing pipe 23c is a flexible hose in which a stirring means is provided, e.g. a core wire and a plurality of vanes alternately disposed thereon, the vanes being separated from each other by a suitable distance and being inclined towards the direction of paint flow.

Compressed air supply device (E) comprises an air compressor and an air hose 24 having one end connected to the compressor. The other end of air hose 24 is connected to an air supply pipe 20 of air motor (B2) in front of film forming device (A).

Forming material supply device (D) and compressed air device (E) are mounted on a vehicle 33 so that they are easily transported to a desired site and capable of being set up for use. An image receiver (G), which is a television receiver corresponding to inspection device (C) in the illustrated embodiment, is also mounted on the vehicle. A camera cable 34 of the receiver has its front end connected to television camera (C) via a connector 35.

Paint supply line 23, air hose 24, camera cable 34 and hauling ropes 25 are assembled at a suitable position by a collecting hose 16 which is then wound on a rotary drum 37. Rotary drum 37 is adapted to unwind the collecting hose when the latter is pulled and to wind the hose when rotated in the opposite direction, thereby comprising hauling device (F). The hauling device is also mounted on vehicle 33, together with film forming material supply device (D), compressed air supply device (E) and image receiver (G).

In order to use the apparatus of the present invention to apply lining on the inner surface of a pipe line, e.g. to an existing underground gas pipe line so as to repair and reinforce the pipe line, it is first necessary to remove scales within the pipe line and clean the inner surface thereof. Such a scale removal operation is carried out by a plurality of steps. Specifically, the gas or other fluid is stopped so that the pipe line can be worked upon, and along the pipe line work holes (c) and (c') are provided in the ground at a distance of approximately 90 m to 150 m to expose pipe line (a). The exposed portion of pipe line (a) is then cut at a suitable point, e.g. a portion approximately 60 cm long. Accordingly, the underground pipe line is cut into a section of approximately 90 m to 150 m in length.

Then, as illustrated in FIG. 13, from an open end (a') of the gas pipe line (a) which has been cut, e.g. into a length of 100 m, scrapers 42 are inserted. The scrapers comprise a plurality of fragments 40 extending radially rearward and having scraping pieces 41 at their tips. The scrapers are hauled by a hauling device 43, e.g. a winch, toward the other open end (a") of gas pipe line (a) whereby scales (d) on the inside of the pipe are scraped off by the moving scraping pieces 41. Further, as shown in FIG. 14, brushes 44 in the form of discs each having a diameter similar to or slightly larger than the diameter of pipe line (a) and having peripheries formed of bristles, are then hauled within the pipe in a manner similar to that described above for scrapers 42 whereby scales (d) are further scraped off and the inner surface of the pipe is cleaned and smoothed.

A plurality of scrapers 42 and/or brushes 44 may be used in a connected manner as shown in the drawings. It is preferable to connect the scrapers or brushes with rotary connectors so that each one is rotatable oppositely with respect to the other. Further, during the hauling operation of the plural scrapers 42 or brushes 44, it is preferable to connect them both at the first and the rear with hauling devices 43 as illustrated in FIGS. 13 and 14 so that they may be moved back and forth within the pipe and gradually advanced to the other open end (a") to achieve more efficient and effective scraping off of the scales.

Scales (d) and like materials which are scraped off or rubbed off the inner wall of the pipe line and collected within the pipe line are then removed from the pipe line.

Specifically, as shown in FIG. 15, open end (a") is connected to a blower 47 via a blower hose 46 and the other open end (a') is connected to a suction device (H) via a suction hose 48. The scales (d) are removed by means of suction device (H) while air is blown into pipe line (a) by means of blower 47.

It is not absolutely necessary to blow air into pipe line (a) by blower 47. Scales in the pipe line may be sufficiently removed by using only suction created by suction device (H). However, with additional use of blower 47, it is possible to remove the scales more completely and within a shorter period of time.

Suction device (H) comprises a blower 50 and a scale collection chamber 51 mounted on a vehicle 49. An air inlet of blower 50 communicates with scale collection chamber 51 via a filter 53, and an air outlet 54 opens to the atmosphere.

After cleaning the inner wall of pipe line (a) by the preparatory steps described above, the film forming operation is carried out on the inner surface of the pipe line by using the apparatus of the present invention.

The film forming operation will be hereinafter described in further detail in accordance with the appropriate procedural steps.

First, from one open end (a') of cut pipe line (a), film forming device (A), film adjusting device (B) and television camera (C) are inserted, with the television camera at the front, and collection hose 36 is passed through pipe line (a). This arrangement is illustrated in FIG. 3.

Figure 9:
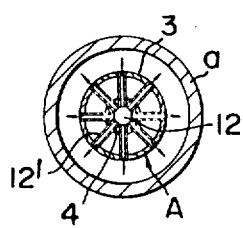
FIG. 9 is a cross-sectional view of the apparatus of FIG. 1 within a pipe line taken along line Y—Y of FIG. 6.

Vehicle 33 on which film forming material supply device (D) is mounted is stationed near work hole (c') located on an opposite side of film forming device (A). Film forming material supply device (D) is then operated to supply the film forming material (b), e.g. the principal liquid and the solidifier liquid, under pressure to an annular-shaped space 55 formed along the periphery of pipe line (a) between front wall 1 and rear wall 2 of film forming device (A) and further defined by front and rear walls 1 and 2, spacer ring 3 and the inner surface of the pipe line (a). This process will completely fill the annular-shaped space with film forming material (b). This step is illustrated by FIG. 9.

The principal liquid and the solidifier liquid are mixed by stirrer elements of mixing pipe 23c and supplied to the film forming device (A) in the mixed state.

At the same time, pressed air supply device (E) is operated to supply compressed air via air hose 24 to the rotary driving means of film adjusting device (B), i.e. air motor (B2), to thereby drive the air motor so as to cause the rotary adjusting means of (B1) to rotate.

While the operator watches the inside of the pipe line as projected on image receiver (G) by inspection device (C), hauling device (F) is operated to pull and move film forming device (A), film adjusting device (B) and inspection device (C) within the pipe line.

More particularly, rotary drum 37 is rotated in a winding direction to wind collection hose 36 whereby film forming device (A), film adjusting device (B) and inspection device (C) are pulled towards the other open end (a") of pipe line (a). During the hauling operation, film forming material (b) is applied onto the inner surface of pipe line (a) by the peripheral portion of elastic sleeve 6 of rear wall 2, then adjusted to form a uniform thickness film (b') by stiff plate 56a of first adjusting piece 56 and further finished by flexible plate 57a of second adjusting piece 57 to form a smooth film.

Accordingly, a uniform, thick and smooth film (b') is formed on the inner surface of pipe line (a). This film essentially comprises a new pipe of a resin freshly installed within an existing old gas pipe line (a) of cast iron or similar material.

By moving film forming device (A) and film adjusting device (B) from one end of pipe line (a) to the other end, it is possible to apply the synthetic resin paint along the entire inner surface of pipe line (a). It is important that all portions likely to lead to a gas leakage, such as a joint portion 10 between separate pipes, are adequately filled with film forming material (b). This can be achieved in the following manner: when film forming device (A) comes to a position where a joint portion 10 of other portion likely to lead to a leakage is located between front and rear walls 1 and 2 of film forming device (A), i.e. so that these walls straddle the portion, the hauling operation is temporarily stopped and film forming material (b) is continuously supplied so that the film forming material (b) will penetrate into the joint portion 10 to completely fill and seal the joint portion. During this step, film applying device (B) should be maintained either in shutdown condition or operated at a lower speed. This can be done by either stopping the supply of air to the air motor or reducing the supply pressure of such air.

The rotation of rotary adjusting means (B1) is adjusted depending upon the discharge rate of the film forming material (b), and will normally be within a range of 100-300 r.p.m.

Figure 10:
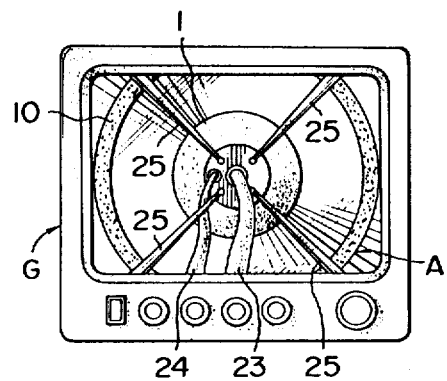
FIGS. 10 through 12 are all perspective views illustrating an image receiver on which the inside of the pipe is televised; these views illustrate the step of determining the relative positioning of the film forming device with respect to a joint portion of a pipe line.
Figure 11:
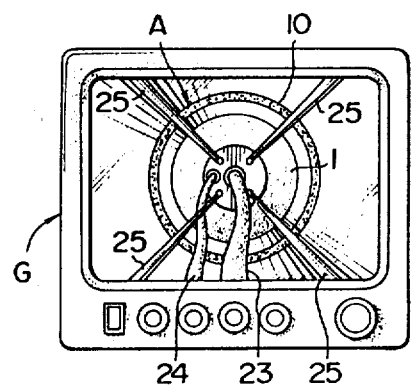
Figure 12:
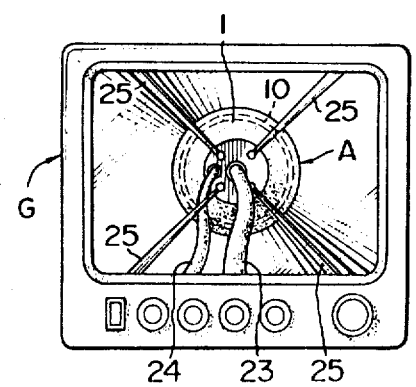

The location of a joint portion or a portion likely to lead to leakage is confirmed by inspection device (C). This operation will be explained with reference to an embodiment in which the inspection device (C) is a television, as illustrated in FIGS. 10 through 12. As film forming device (A) and television camera (C) move on, an image of a possibly leaking portion, e.g. joint portion 10, on television image receiver (G), which is illustrated in FIG. 10, becomes smaller as shown in FIG. 11, and then disappears behind front wall 1 as shown in FIG. 12. The portion disappears from view when it comes within space 55. At this position, the hauling operation should be temporarily stopped, and when space 10 is completely filled with film forming material (b), the hauling operation is to be resumed. At the same time that the hauling operation resumes, the rotational speed of rotary adjusting means (B1) should be reset at its original speed.

After completion of the movement of film forming device (A) and film applying device (B) from one end to the other of cut pipe line (a), as described above, the film is dried, and then the cut section of pipe line is rejoined to the rest of the pipe line and work holes (c) and (c') are filled to complete the job.

When cut pipe line (a) has a bent or curved portion, e.g. elbow shaped, through which film forming device (A) and film adjusting device (B) are to pass, as shown in FIG. 7, flexible connecting rod 58, connecting film forming device (A) with film adjusting device (B), and universal joint 15, connecting rotary driving means (B2) of film adjusting device (B) with rotary adjusting means (B1), flexibly conform to the curvature of the bent portion so that film forming device (A) and film adjusting device (B) can smoothly pass through the bent portion.

The film forming material (b) to be used for the work is not limited to a two liquid synthetic resin paint. It may be a single liquid paint. When pipe line (a) is a drainage pipe, the film forming material may be a combination of a cement mortar and a quick setting agent.

Further, in the above described embodiment, an air motor is used as rotary driving means (B2) for film adjusting device (B). However, other driving sources, e.g. an electrically driven motor, may be used instead of the air motor.

The difference in stiffness between the first and second adjusting pieces 56 and 57 of rotary adjusting means (B1) is accomplished by differentiating the thickness of elastic plates 56a and 57a in the above described embodiment. However, this can be done in a different manner, e.g. by differentiating the material from which elastic plates 56a and 57a are made.

Having thus described the invention, it should be understood that in accordance with the invention it is possible to reinforce or repair a pipe line by applying a film over the inner surface of the pipe line to cover a joint portion or any other possible leaking portion thereof to thereby prevent leakage and simultaneously increase the pressure resistance of the pipe line and decrease frictional resistance of the inner surface of the pipe line. By applying a film forming material to the pipe line while the film forming device is stopped at the location of a possible leaking portion, e.g. a joint portion or a cracked portion, it is possible to let the film forming material penetrate deeply into the possibly leaking portion and thereby completely and securely seal such portion whereby effective prevention of leakage is ensured.

After a film is formed by the film forming device, any excess film forming material or any excess amount of the material at a particularly thick portion thereof will be transferred by the film adjusting device to the upper portion of the pipe line whereby the material will be evenly applied to form a smooth film at a substantially uniform thickness.

The film adjusting device is connected to the film forming device and is held therewith simultaneously. Thus, two separate applying steps, i.e. the first application step and the finishing step, are carried out simultaneously and the work can accordingly be done easily and in a short period of time.

Furthermore, the film forming device and the film adjusting device, as well as the rotary driving means and the rotary adjusting means, respectively, are flexibly connected to each other. This connection enables the apparatus to freely turn along and pass through a bent or curved portion of the pipe line to be lined. Thereby the apparatus of the present invention is quite useful for lining the inner surface of an underground pipe line, e.g. a gas pipe line, which usually has many bent portions.

Further, according to the invention, it is possible to conduct the work while operators watch the inside of the pipe line, the film forming device and possibly leaking portions by means of an inspection device. It is accordingly possible to accurately control the positioning of the film forming device and when it should be stopped so that the work can easily be done without failure. Additionally, when an accident occurs, the situation can readily be seen and understood and appropriate steps immediately taken to cope with the situation.

Therefore, the objects of the invention can effectively be accomplished.

By pipe line is meant pipes, tubes, conduits, pipings and all other similarly shaped and/or used structures.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method for reinforcing and repairing a pipe line, using a film forming device, a film adjusting device, and means for inspecting the inner surface of the pipe line, said method comprising:
   (a) inserting said film forming device, said inspecting means, and said film adjusting device into a pipe line in spaced-apart relation;
   (b) moving said film forming device, said pipe line inspecting device, and said film adjusting device through said pipe line along a predetermined direction of movement, whereby said inspecting means are disposed forwardly of said film forming means and said film adjusting means, as viewed in said direction of movement, said inspecting means thereby having a viewing angle directed rearwardly towards said film forming means;
   (c) applying said film forming material to the inner surface of said pipe line;
   (d) inspecting said inner surface to locate possible leakage portions of said pipe line while moving said devices by directing said inspection means rearwardly with respect to said direction of movement;
   (e) stopping all of said devices when said film forming device is positioned adjacent one of said portions; and
   (f) applying said material to said area to completely and securely seal such portions while said devices are stopped.

2. A method in accordance with claim 1 further comprising adjusting the amount of material supplied to said surface.

3. A method in accordance with claim 1 further comprising scraping and brushing scales and similar material from said inner surface and evacuating said scales and similar material from said pipe line.

* * * * *